United States Patent
Saito et al.

(10) Patent No.: US 7,862,945 B2
(45) Date of Patent: Jan. 4, 2011

(54) FUEL CELL SYSTEM

(75) Inventors: Tomohiro Saito, Chiryu (JP); Hideki Kashiwagi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 731 days.

(21) Appl. No.: 11/446,163

(22) Filed: Jun. 5, 2006

(65) Prior Publication Data
US 2006/0222917 A1 Oct. 5, 2006

Related U.S. Application Data

(63) Continuation of application No. PCT/JP2005/004015, filed on Mar. 2, 2005.

(30) Foreign Application Priority Data
Mar. 4, 2004 (JP) ............................ 2004-061032

(51) Int. Cl.
*H01M 8/04* (2006.01)
*B60L 8/00* (2006.01)

(52) U.S. Cl. .................... 429/430; 180/65.31
(58) Field of Classification Search ............... 429/23
See application file for complete search history.

(56) References Cited

U.S. PATENT DOCUMENTS 6,238,814 B1    5/2001  Horiguchi et al.
6,972,159 B2   12/2005  Autenrieth et al.
2003/0224224 A1* 12/2003 Okada et al. ................ 429/7

FOREIGN PATENT DOCUMENTS

| DE | 101 25 106 A1 | 12/2002 |
| JP | A-63-181269 | 7/1988 |
| JP | 09231991 A * | 9/1997 |
| JP | A 9-231991 | 9/1997 |
| JP | A-11-317236 | 11/1999 |
| JP | A 2000-285943 | 10/2000 |
| JP | A 2001-28807 | 1/2001 |
| JP | 2002134149 A * | 5/2002 |
| JP | A 2002-134149 | 5/2002 |
| JP | A 2003-518357 | 6/2003 |

* cited by examiner

*Primary Examiner*—Patrick Ryan
*Assistant Examiner*—Karie O'Neill Apicella
(74) *Attorney, Agent, or Firm*—Oliff & Berridge, PLC

(57) ABSTRACT

A fuel cell system according to the present invention has a movement drive device (load) (2), a fuel cell (10) for supplying electric power to the drive device, an electric power storing device (31) consuming electric power equivalent to the consumption power of the drive device, and an electronic control unit (connection control unit) (4) for controlling the connection of the fuel cell to the drive device. Before the fuel cell is connected to the drive device by the control of the electronic control unit, the fuel cell is made to generate electric power equivalent to the consumption power of the drive device, and the generated power is supplied to the electric power storing device. When a fuel cell voltage at the time of supply of the electric power to the electric power storing device is not less than a specified value, the connection between the fuel cell and the drive device is permitted.

8 Claims, 3 Drawing Sheets

FUEL CELL SYSTEM

This is a Continuation of Application No. PCT/JP2005/004015 filed Mar. 2, 2005, which claims the benefit of Japanese Patent Application No. 2004-061032 filed Mar. 4, 2004. The disclosures of the prior applications are hereby incorporated by reference herein in their entirety.

TECHNICAL FIELD

The present invention relates to a fuel cell system, and more particularly to activation control of a fuel cell.

BACKGROUND ART

Fuel cells have been brought to the world's attention as an environment-friendly and clean power source. The fuel cells generate electric power, using an electrochemical reaction between a fuel such as hydrogen, and air. Activation of a fuel cell requires time to supply the fuel and air and control the temperature. For example, JP-A-9-231991 describes that warm-up is done by supplying electric power to auxiliary machinery for which a specified low electric current is sufficient, before connecting a fuel cell to a load (or motor), and then electric power is supplied to the load after the warm-up.

[Patent Document 1] JP-A-9-231991

DISCLOSURE OF THE INVENTION

However, in this case of the related art, even if the fuel cell operates normally when the electric power is supplied to the auxiliary machinery, once the power supply destination is switched immediately after the warm-up, from the auxiliary machinery to the load (such as a motor for driving a vehicle) that consumes a larger amount of electric power, the load rapidly consumes a high electric current and, therefore, there is the possibility of a decrease in the voltage of the fuel cell. For example, if a driver tries to suddenly accelerate a fuel cell vehicle immediately after activating the fuel cell and connecting it to the load (or motor), there is the possibility that the fuel cell may not generate a sufficient amount of power to fulfill the required amount of electric power for the load, and the driver's driving expectations may not be satisfied.

This invention aims to solve the problem of the above-described related art, and it is an object of the invention to provide a fuel cell system that can enhance the output stability of the fuel cell after connecting the fuel cell to the load.

In order to achieve the above-described object, the fuel cell system according to this invention includes: a load; a fuel cell for supplying electric power to the load; an electric power storing device that can be charged with at least the electric power equivalent to the consumption power of the load; and a connection control unit for controlling the connection of the fuel cell to the load. Before the connection control unit connects the fuel cell to the load, the fuel cell is made to generate electric power equivalent to the consumption power of the load, and the generated power is supplied to the electric power storing device. By supplying the electric power equivalent to the consumption power of the load to the electric power storing device before connecting the fuel cell to the load, it is possible to prevent a decrease of the fuel cell voltage when connecting the fuel cell to the load, and to enhance output stability after connecting the fuel cell to the load. Moreover, since the electric power generated by the fuel cell before it is connected to the load is used to charge the electric power storing device, the electric power from the electric power storing device that was used to drive the auxiliary machinery or for other purposes can be compensated for.

In the above-described fuel cell system, it is preferable that when the fuel cell is activated and before the connection control unit connects the fuel cell to the load, the fuel cell is made to generate electric power equivalent to the consumption power of the load, and the generated power is supplied to the electric power storing device.

It is also preferable that the electric power equivalent to the consumption power of the load is the electric power equivalent to the maximum consumption power of the load.

Moreover, it is preferable that the fuel cell system further includes a control unit for controlling the fuel cell in order to generate electric power that can be used to charge the electric power storing device.

In the above-described fuel cell system, it is preferable that the control unit calculates the maximum permissible charge power for the electric power storing device based on at least the voltage of the electric power storing device, and controls the fuel cell according to the maximum charge power. It is possible to prevent the electric power storing device from exceeding its limit by deciding the voltage of electric power to be generated based on the maximum permissible charge power of the electric power storing device.

In the above-described fuel cell system, it is preferable that the fuel cell system further includes a voltage detecting device for detecting the voltage of the fuel cell, and that the connection control unit judges whether the fuel cell voltage detected by the voltage detecting device at the time of the supply of the electric power to the consumption device is equal to or more than a specified value; and if the fuel cell voltage is equal to or more than the specified value, the connection control unit permits the connection of the fuel cell to the load. Since the fuel cell is connected to the load after confirming that there is no abnormality in the fuel cell voltage even if the electric power equivalent to the load is generated in the fuel cell, output stability after connecting the fuel cell to the load can be further enhanced.

In the fuel cell system, it is preferable that the voltage detecting device detects each cell voltage of the fuel cell. By detecting each cell voltage, it is possible to correctly comprehend the activation state.

Moreover, in a vehicle equipped with the above-described fuel cell, it is preferable that the load includes a vehicle movement drive device, and the electric power equivalent to the maximum consumption power of the load is the electric power equivalent to the maximum consumption power of the movement drive device after its activation.

By applying the fuel cell system described above to the vehicle, it is possible to stabilize the output of the fuel cell even when the vehicle is suddenly accelerated after connecting the fuel cell to the load.

BEST MODE FOR CARRYING OUT THE INVENTION

Embodiments of this invention will be described below with reference to the attached drawings, by showing an example in which the invention is applied to a vehicle.

<1. System Configuration>

Figure 1:
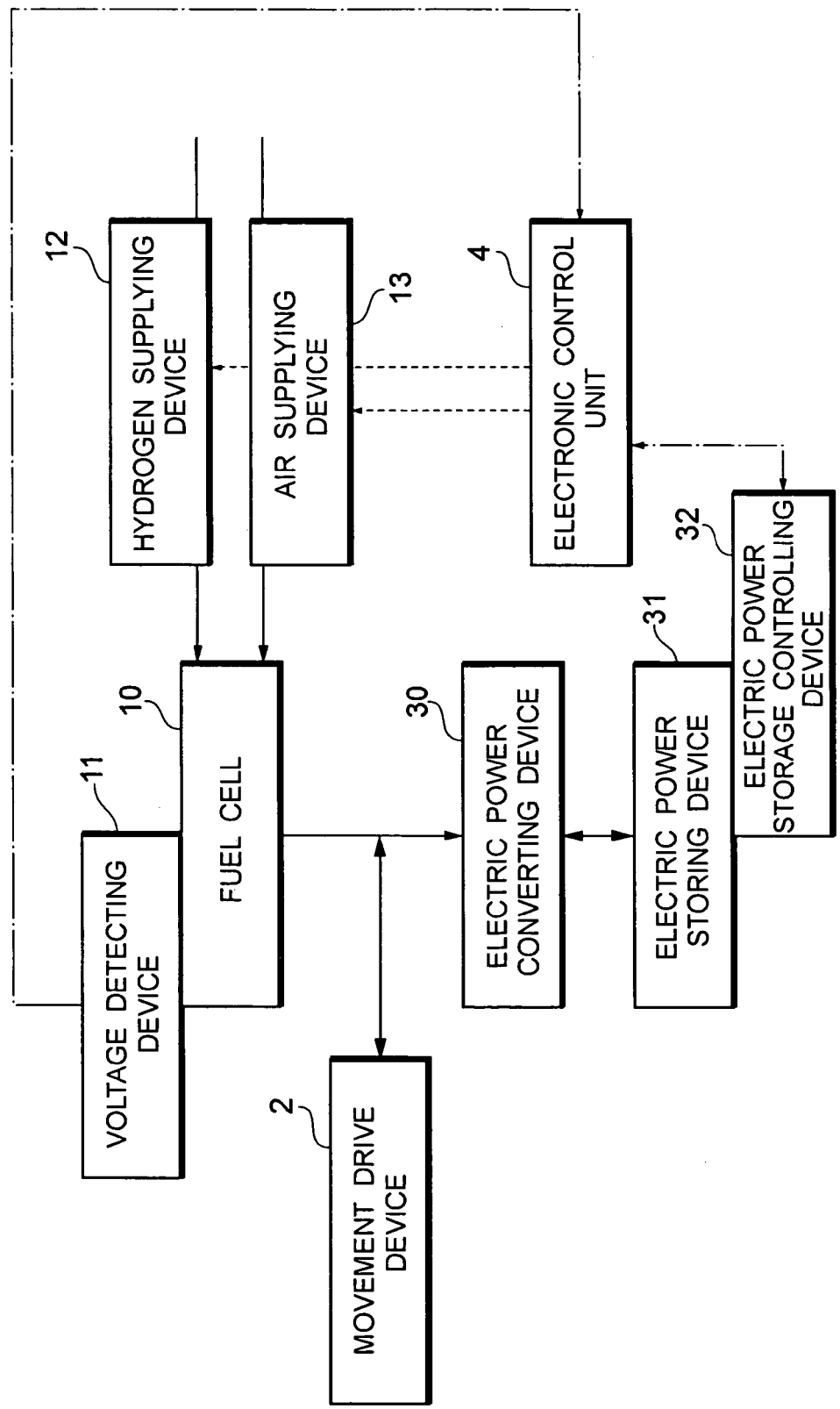
FIG. 1 is a schematic block diagram of a fuel cell system according to the first embodiment of this invention.

FIG. 1 is a schematic block diagram of a fuel cell system according to the first embodiment of the invention. This system includes a fuel cell 10, a voltage detecting device 11, a hydrogen supplying device 12, an air supplying device 13, a movement drive device 2, an electric power converting device 30, an electric power storing device 31, an electric power storage controlling device 32, and an electronic control unit 4.

The fuel cell 10 receives the supply of hydrogen and air from the hydrogen supplying device 12 and the air supplying device 13 respectively and thereby generates electric power by means of an electrochemical reaction. The voltage detecting device 11 detects each cell voltage of the fuel cell and outputs the detected voltage value of each cell to the electronic control unit 4.

The movement drive device 2 is composed of, for example, a traction inverter and a three-phase synchronous motor and generates a driving force with the electric power supplied from the fuel cell 10 and the electric power converting device 30, thereby driving the wheels of a vehicle.

The electric power converting device 30 is composed of, for example, a direct current voltage converter and has a function that supplies the electric power stored in the electric power storing device 31 to the movement drive device 2, and another that, on the other hand, stores, in the electric power storing device 31, the electric power regenerated by the movement drive device 2 and dump power generated in the fuel cell 10. Moreover, since both the output terminals of the electric power converting device 30 on the fuel cell side are respectively connected to both the output terminals of the fuel cell 10, the output voltage of the entire fuel cell 10 can be set according to the output voltage of the electric power converting device 30. Therefore, the electric power converting device 30 constitutes a control unit for the fuel cell.

The electric power storing device 31 can be composed of, for example, a secondary battery or a capacitor. This electric power storing device 31 should have sufficient battery capacity to be able to accept, as charge power, the electric power equivalent to or more than the consumption power of the movement drive device 2.

The electric power storage controlling device 32 calculates the maximum charge power that can be used to charge the electric power storing device, based on the voltage, battery capacity (SOC), and temperature of the electric power storing device 31, and outputs the maximum charge power to the electronic control unit 4. Moreover, charge and discharge control of the electric power storing device 31 is performed based on the output of the electronic control unit 4.

The electronic control unit 4 outputs a signal to designate the hydrogen and air supply amount to the hydrogen supplying device 12 and the air supplying device 13 of the fuel cell, based on the output of an accelerator pedal angle detector or similar not shown in the drawing. Moreover, based on the maximum charge power that can be used to charge the electric power storing device as calculated by the electric power storage controlling device 32, the electronic control unit 4 decides the electric power to be generated by the fuel cell, which is equivalent to or less than the maximum charge power, and calculates a fuel cell voltage based on this electric power to be generated by the fuel cell, and sends it to the electric power storage controlling device 32. Furthermore, the electronic control unit 4 constitutes a connection control unit of this invention, and judges, based on the signal from the voltage detecting device 11 of the fuel cell, whether the connection to the movement drive device 2, which is the load, can be permitted or not. Specifically speaking, the electronic control unit 4 judges whether the fuel cell voltage detected by the voltage detecting device 11 is equal to or more than a specified value or not; and if the fuel cell voltage is equal to or more than the specified value, the electronic control unit 4 sends a control signal to a change-over switch not shown in the drawing and connects the fuel cell 10 to the movement drive device 2.

<2. Control Flow>

Figure 2:
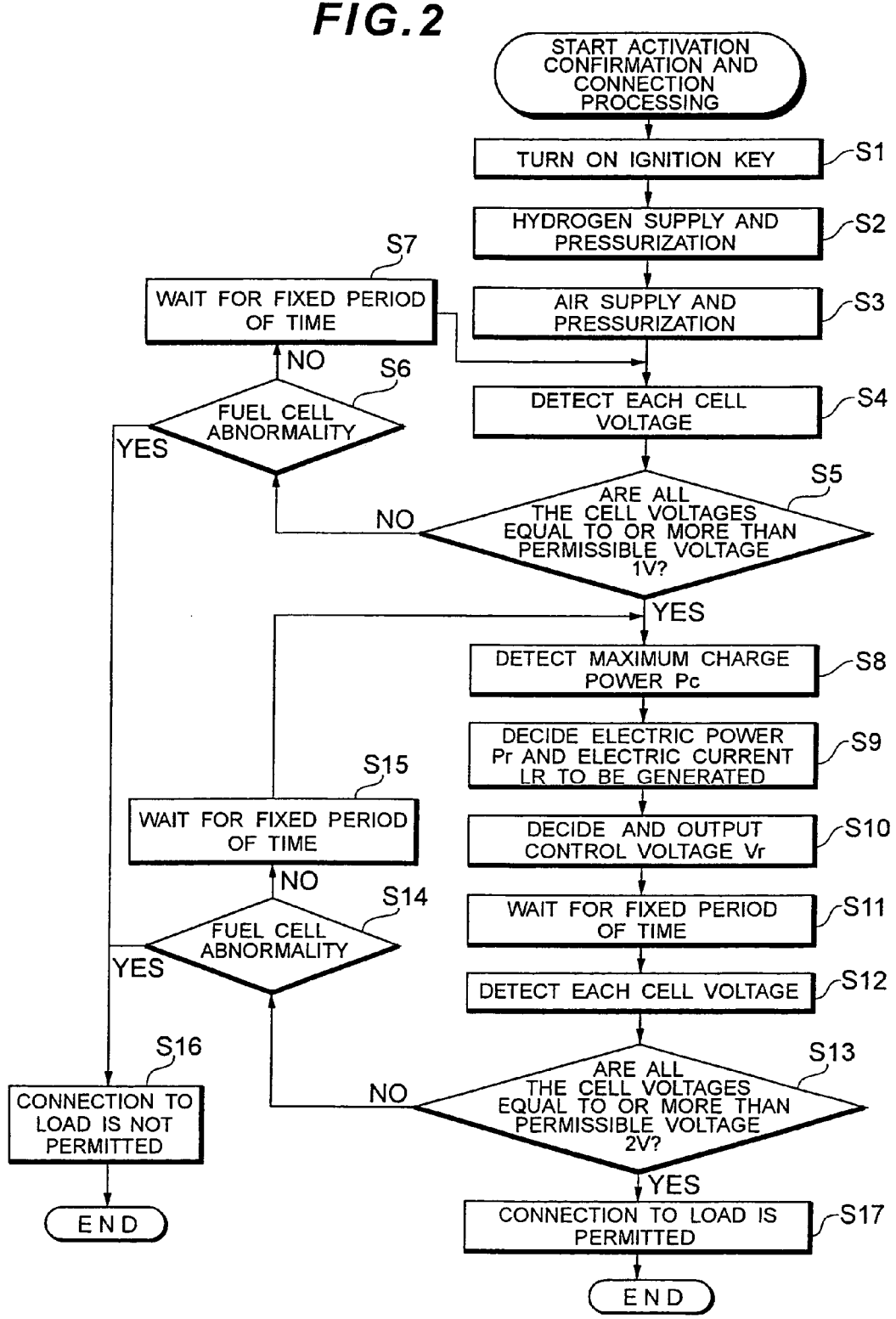
FIG. 2 is a flowchart explaining a processing sequence executed by the fuel cell system according to the first embodiment to confirm activation and judge whether connection to a load can be permitted or not.

FIG. 2 is a flowchart explaining a processing sequence executed by the fuel cell system according to the above-described embodiment to confirm activation and judge whether the connection to the load can be permitted or not. The processing explained in this flowchart is executed by the electronic control unit 4 and the electric power storing device 32 at the time of activation of the fuel cell system.

When an ignition key is turned on in step S1, the supply of hydrogen is started and pressurization is conducted in step S2, and the supply of air is started and pressurization is conducted in step S3.

In step S4, each cell voltage of the fuel cell is detected by incorporating the output of the voltage detecting device 11. Then in step S5, a judgment is made on whether all the cell voltages are equal to or more than a permissible voltage $V_1$ or not. This value $V_1$ is, for example, 0.9V for each cell. If any cell voltage is less than $V_1$ (step S5: NO), a judgment is made in step S6 on whether there is any abnormality, such as failure in the fuel cell. If there is any abnormality (step S6: YES), it is determined in step S16 that the connection to the load cannot be permitted, and the processing sequence is then terminated. If there is no abnormality (step S6: NO), the electronic control unit 4 waits for a fixed period of time in step S7 because the fuel cell has not been activated yet; and then the processing returns to step S4 and each cell voltage is detected. On the other hand, if all the cell voltages have reached $V_1$ (step S5: YES), the processing proceeds to the next step and a judgment is made on whether the connection should be permitted or not.

In step S8, the maximum charge power Pc that can be used to charge the electric power storing device as calculated by the electric power storage controlling device 32 is detected. Then in step S9, electric power Pr to be generated by the fuel cell is decided based on the maximum charge power Pc. It is preferable that the electric power Pr to be generated by the fuel cell is less than the chargeable power Pc and close to the maximum output of the movement drive device 2 after its activation. The electric power Pr to be generated by the fuel cell should be less than the maximum charge power Pc in order to prevent the electric power storing device from exceeding its limit. The electric power Pr to be generated by the fuel cell should be close to the maximum output of the movement drive device 2 after its activation because it is supposed to be no problem after connecting the fuel cell to the drive device if it has been confirmed that the fuel cell's generation of the electric power equivalent to the consumption power of the movement drive device will not have any adverse effect on the power generating ability. Moreover in step S9, an electric current Ir to be generated is also decided based on the electric power Pr to be generated. This electric current to be generated is decided according to an current-electric power characteristic map for the fuel cell 10.

In step S10, a control voltage Vr of the fuel cell is decided based on the electric current Ir to be generated, and is sent to the electric power storage controlling device 32. This control voltage Vr is decided according to a current-voltage characteristic map for the fuel cell 10.

After sending the control voltage Vr of the fuel cell to the electric power storage controlling device 32, the electronic control unit 4 waits for a fixed period of time (for example, 200 milliseconds) to elapse in step S11 and reads, in step S12, the value of each cell voltage from the voltage detecting device 11 after the fixed period of time has elapsed.

In step S13, each cell voltage is compared with a permissible voltage $V_2$. This value $V_2$ is, for example, 0.4V for each cell. If any cell voltage is less than $V_2$ (step S13: NO), a judgment is made in step S14 on whether there is any abnormality, such as failure in the fuel cell. If there is abnormality (step S14: YES), it is determined that the connection to the load cannot be permitted in step S16, and the processing sequence is then terminated. If there is no abnormality (step S14: NO), the electronic control unit 4 waits for a fixed period of time in step S15 because the fuel cell has not been activated sufficiently; and then the processing returns to step S8 and the maximum charge power Pc is calculated. On the other hand, if all the cell voltages have reached $V_2$ (step S13: YES), it is determined in step S17 that the connection can be permitted, and the processing sequence is then terminated. Once the connection is permitted, the fuel cell can be connected to the drive device. Therefore, in the case of an automobile, a driver can safely start moving the automobile by putting the gearshift lever into drive and pushing the accelerator pedal.

Figure 3:
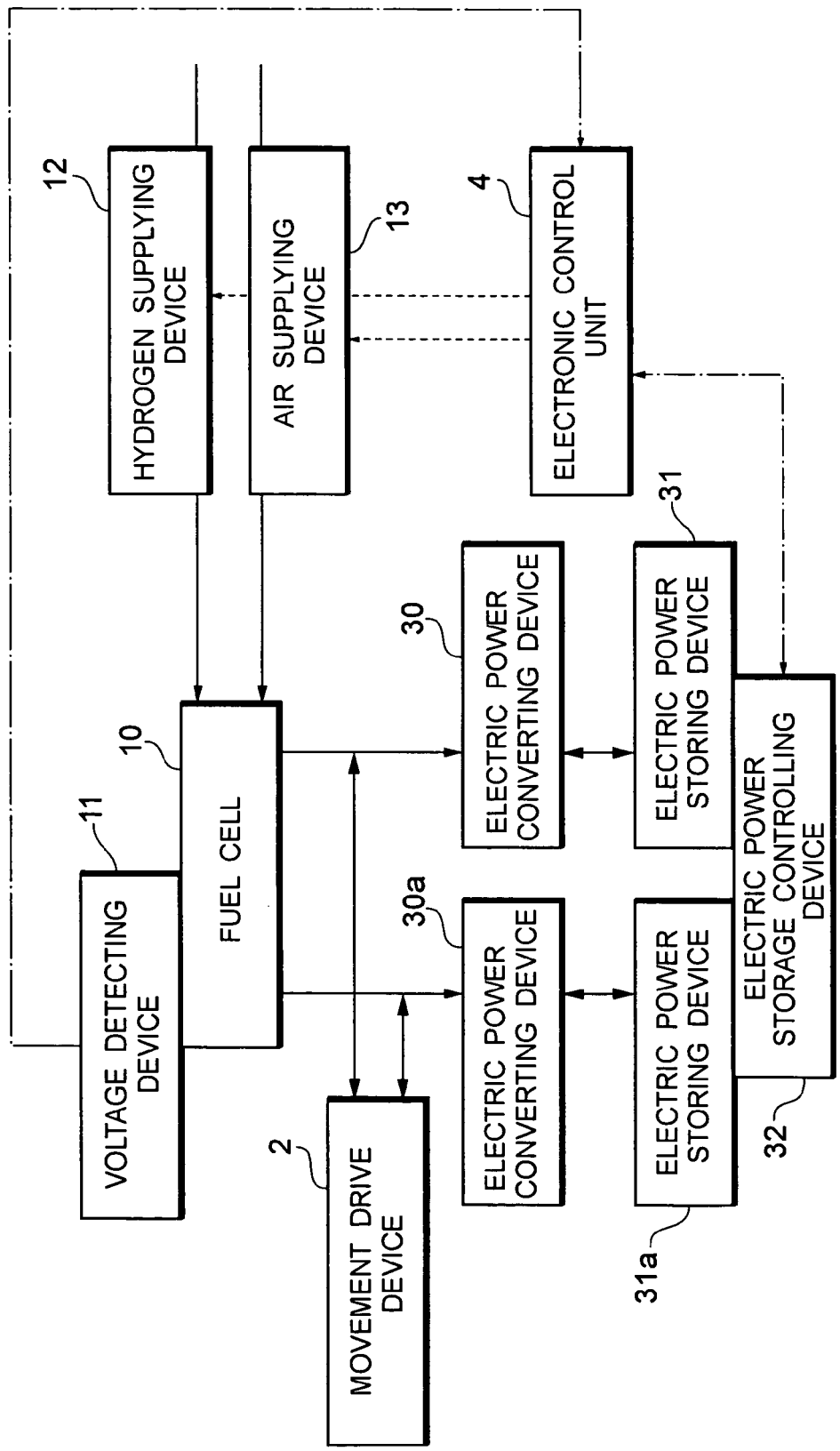
FIG. 3 is a schematic block diagram of a fuel cell system according to the second embodiment of this invention.

FIG. 3 is a schematic block diagram of a fuel cell system according to the second embodiment of the invention. Its elements the same as those of the first embodiment shown in FIG. 1 are given the same reference numerals as in the first embodiment, and any detailed description thereof is omitted.

The second embodiment is designed to supply a discharge voltage of an electric power storing device 31a to the movement drive device 2 so that a vehicle can travel even when warm-up is being performed, by charging the electric power storing device 31 with electric power generated by the fuel cell 10. In the example shown in FIG. 3, two sets of electric power storing devices, the electric power storing devices 31 and 31a, are provided. Accordingly, two sets of electric power converting devices, the electric power converting devices 30 and 30a, are provided. During the warm-up of the fuel cell, the electric power generated by the fuel cell 10 is used to charge the electric power storing device 31 and the electric power necessary to drive the movement drive device 2 is supplied to the electric power storing device 31a. After the warm-up of the fuel cell 10 terminates, both the electric power storing devices 31 and 31a are used for the driving purpose or for charging with the regenerated power or charging with the power from the fuel cell 10.

Incidentally, the functions of the electric power storing devices 31 and 31a may be divided so that the electric power storing device 31a is used as the electric power storing device (or power source) for the movement drive device 2, and the electric power storing device 31 is used as the electric power storing device (or power source) for fuel cell auxiliary machinery (such as an air compressor and a pump) and vehicle auxiliary machinery (such as an air conditioner, a dynamo-electric brake, and an electric steering pump). Moreover, the power supply destinations of the two electric power storing devices may be switched, or the charge and discharge distribution destinations may be changed.

Furthermore, without limitation to the configuration illustrated in FIG. 3, it is possible to adopt a configuration that can switch between the warm-up power generation and the drive power generation, or one set of electric power storing devices may be divided to have the divided parts take charge of their respective functions. Also, one electric power storing device or both the electric power storing devices may be not only a secondary battery (or secondary batteries), but also a capacitor (or capacitors).

INDUSTRIAL APPLICABILITY

The present invention is effective in enabling the enhancement of the output stability of the fuel cell after connecting the fuel cell to the load, and can be widely utilized for any fuel cell system with such a demand.

What is claimed is:

1. A fuel cell system comprising:
   a load;
   a fuel cell for supplying electric power to the load;
   an electric power storing device that can be charged with at least an electric power equivalent to a consumption power of the load; and
   a connection control unit for controlling a connection of the fuel cell to the load,
   wherein the connection control unit is programmed to cause the fuel cell to generate electric power equivalent to the consumption power of the load, and confirm activation and judge whether the connection to the load can be permitted before connecting the fuel cell to the load.

2. The fuel cell system according to claim 1, wherein when the fuel cell is activated and before the connection control unit connects the fuel cell to the load, the fuel cell is made to generate electric power equivalent to the consumption power of the load, and the generated power is supplied to the electric power storing device.

3. The fuel cell system according to claim 2, wherein the electric power equivalent to the consumption power of the load is the electric power equivalent to a maximum consumption power of the load.

4. The fuel cell system according to claim 1, further comprising a control unit for controlling the fuel cell in order to generate electric power that can be used to charge the electric power storing device.

5. The fuel cell system according to claim 4, wherein the control unit calculates a maximum permissible charge power of the electric power storing device based on at least a voltage of the electric power storing device, and controls the fuel cell according to a maximum charge power.

6. The fuel cell system according to claim 1, further comprising a voltage detecting device for detecting a voltage of the fuel cell,
   wherein the connection control unit judges whether the fuel cell voltage detected by the voltage detecting device at a time of supply of the electric power to the electric power storing device is equal to or more than a specified value; and if the fuel cell voltage is equal to or more than the specified value, the connection control unit permits the connection of the fuel cell to the load.

7. The fuel cell system according to claim 6, wherein the voltage detecting device detects each cell voltage of the fuel cell.

8. A vehicle equipped with the fuel cell system according to claim 3, wherein the load includes a vehicle movement drive device, and the electric power equivalent to the maximum consumption power of the load is the electric power equivalent to the maximum consumption power of the vehicle movement drive device after its activation.

* * * * *

UNITED STATES PATENT AND TRADEMARK OFFICE
CERTIFICATE OF CORRECTION

| | |
|---|---|
| PATENT NO. | : 7,862,945 B2 |
| APPLICATION NO. | : 11/446163 |
| DATED | : January 4, 2011 |
| INVENTOR(S) | : Tomohiro Saito et al. |

It is certified that error appears in the above-identified patent and that said Letters Patent is hereby corrected as shown below:

On the Title Page

Please delete the following:

Item "(73) Assignee:   Toyota Jidosha Kabushiki Kaisha
                      Toyota (JP)"

And replace with:

(73) Assignee:   Toyota Jidosha Kabushiki Kaisha
                 Toyota (JP)

Denso Corporation
                 Kariya (JP)

Signed and Sealed this
Tenth Day of April, 2012

David J. Kappos
*Director of the United States Patent and Trademark Office*